Figure 1:
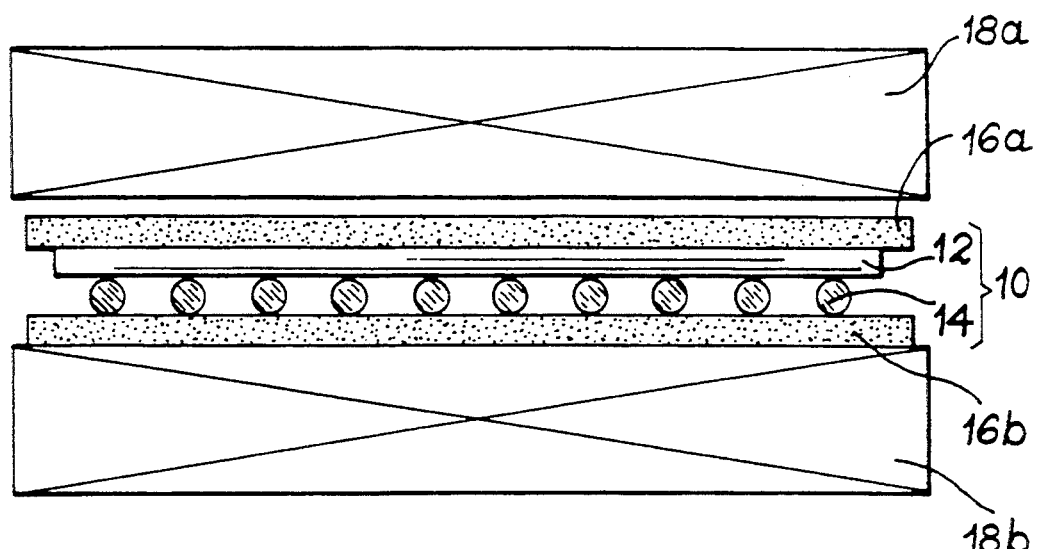

United States Patent [19]

Montagne et al.

[11] Patent Number: 5,380,388
[45] Date of Patent: Jan. 10, 1995

[54] PROCESS FOR THE PRODUCTION OF A TIGHT COMPLEX SHEET HAVING A RANDOM SHAPE AND INCORPORATING AN INTERNAL REINFORCEMENT

[75] Inventors: Marc H. Montagne, Merignac; Olivier Regipa, Toulouse, both of France

[73] Assignee: Aerospatiale Societe Nationale Industrielle, France

[21] Appl. No.: 108,070

[22] Filed: Aug. 17, 1993

Related U.S. Application Data

[63] Continuation of Ser. No. 797,685, Nov. 25, 1991, abandoned.

[30] Foreign Application Priority Data

Nov. 26, 1990 [FR] France ............................ 90 14745

[51] Int. Cl.⁶ ............................ B29D 9/00; D04H 3/04
[52] U.S. Cl. ............................ 156/179; 156/177; 156/178; 156/309.9; 156/320; 156/322; 156/324
[58] Field of Search ............... 156/179, 177, 178, 324, 156/436, 440, 441, 322, 320, 309.9, 555

[56] References Cited

U.S. PATENT DOCUMENTS

| | | | |
|---|---|---|---|
| 3,020,194 | 2/1962 | Jerothe | 156/555 X |
| 3,535,180 | 10/1970 | Gasaway . | |
| 3,627,613 | 12/1971 | Skolki | 156/309.9 X |
| 3,687,764 | 8/1972 | Rogosch et al. . | |
| 3,791,911 | 2/1974 | Yeager et al. | 156/179 X |
| 4,090,902 | 5/1978 | Ferrentino et al. | 156/322 X |
| 4,397,703 | 8/1983 | Osborn | 156/179 X |

FOREIGN PATENT DOCUMENTS

| | | | |
|---|---|---|---|
| 0118628 | 9/1984 | European Pat. Off. . | |
| 0151501 | 8/1985 | European Pat. Off. . | |
| 0261246 | 9/1987 | European Pat. Off. . | |
| 1337011 | 7/1963 | France | 156/309.9 |
| 2306063 | 10/1976 | France . | |
| 3726827 | 3/1988 | Germany . | |
| 3821172 | 1/1989 | Germany . | |

*Primary Examiner*—Jeff H. Aftergut
*Attorney, Agent, or Firm*—Hayes, Soloway, Hennessey, Grossman & Hage

[57] ABSTRACT

For the production of a tight complex having an internal reinforcement or framework and more particularly intended for the production of aerostatic balloons, a nonwoven reinforcement (10) is formed from weft and warp threads arranged in the form of two superimposed layers. To each of the faces of said reinforcement and using a predetermined force is applied a covering film (16a, 16b), after bringing it to its pasty melting point on a heating drum (30a, 30b). The nonwoven character of the reinforcement makes it possible to preserve the seal of the covering films during complexing. Moreover, the formation of small loops or rings on the edges of the complex obtained in this way makes it possible to introduce connecting cables facilitating the taking up or absorption of stresses.

14 Claims, 10 Drawing Sheets

PROCESS FOR THE PRODUCTION OF A TIGHT COMPLEX SHEET HAVING A RANDOM SHAPE AND INCORPORATING AN INTERNAL REINFORCEMENT

This is a continuation of copending application(s) Ser. No. 07/797,685 filed on Nov. 25, 1991, now abandoned.

DESCRIPTION

The invention relates to a process for the production of a tight complex sheet having a random shape and incorporating an internal reinforcement or framework, e.g. formed by heat sealable threads such as high strength polyethylene threads, as well as two covering films ensuring the tightness of the sheet and made from a meltable material such as polyethylene. The invention also relates to a machine for performing this process, as well as to a tight complex sheet obtained by this process and which is called a "complex" throughout the present text.

In widely varying technical fields, use is made of tight panels or envelopes, whose structure must be able to withstand forces which, in certain cases, can be extremely high. Particular reference is made to the fields of aerostatic balloons, flexible architectural structures, parachutes and sails. An envelope or panel is generally obtained by assembling several tight complexes.

In order to obtain good mechanical strength qualities, consideration has been given to the production of the complexes by placing a woven reinforcement between two films of a meltable material such as polyethylene. For producing the woven reinforcement, high strength polyethylene threads such as HP-PE-Dyneema SK60 threads (registered trademark) are used, which have strength characteristics which cannot at present be bettered.

When it is wished to produce such a tight complex, the woven reinforcement is placed between two polyethylene films of limited thickness and the assembly is placed in a heating press in order to carry out the "complexing" of said assembly. However, the force applied by the press to the thus formed stack leads to a punch effect in each of the zones where the small woven reinforcement surfaces are in contact with the plane of the covering films. This punch effect caused by the interlacing of weft and warp threads of the woven reinforcement, at high temperature leads to the appearance of leak lines in the vicinity of said zones.

In order to obtain a tight complex, it is then necessary to put into place on each of the faces of the complex a second polyethylene film. However, although this solution leads to the desired sealing action, it makes more complicated the production of the complex and increases the weight and costs in an undesirable manner.

Moreover, the taking up of stresses on the edges of complexes produced in accordance with conventional methods, e.g. during the edge-to-edge assembly of several complexes, in order to obtain a tight panel or envelope, still causes problems which are very difficult to solve. These problems are further complicated when the complexes to be produced are not rectangular.

The complexes obtained by existing methods have a regular or homogeneous structure and are in the form of strips having a constant width. Sheets having a non-rectangular shape are cut from these strips. In all cases, when the complex is subject to irregular or inhomogeneous forces, these procedures lead to a considerable increase in weight, because the adopted dimensioning criterion is then the maximum stress instead of the local stress.

The invention is more particularly directed at a novel process for the production of a tight complex, which is optimized from the shape and stress standpoints, which has an internal reinforcement making it possible to obtain the desired tightness without it being necessary to put into place a second polyethylene film on each of the faces of the complex, so as to reduce the production time and cost of said complex.

The invention also relates to a process making it possible to produce a tight complex having a rectangular or non-rectangular shape and whose edges easily ensure the optimized absorption of stresses.

The invention also relates to a machine for performing the process, as well as to a tight complex obtained by this process.

The invention therefore proposes a process for the production of a tight complex incorporating an internal reinforcement, as well as two covering films for the said reinforcement, comprising the stages of producing a nonwoven reinforcement formed from warp threads and weft threads arranged on two juxtaposed layers in the manner of a grid, preheating the covering films to the thermoassembly temperature and application of preheated covering films to the nonwoven reinforcement, with a predetermined force and a complexing temperature below the thermoassembly temperature and at the most equal to the maximum temperature which can be withstood by the threads.

The thermoassembly temperature is e.g. the pasty melting point in the case of meltable materials such as polyethylene, the thermobonding temperature in the case of using thermally reactivatable glues or adhesives, such as polyester adhesives, e.g. adhesives GTS 100 or 300 produced by . . . or the evaporation temperature, when using conventional adhesives having two components of the epoxy adhesive type.

The complex obtained by this process incorporates a nonwoven reinforcement, whose warp threads and weft threads are merely crossed in order to form a grid without any interlacing. When the complexing of the assembly is carried out, the support surface for the covering films on the reinforcement is consequently important. Therefore, for the same temperature, pressure and application time of the films against the reinforcement, the penetration of the films is less than for an equivalent woven reinforcement, so that the complex obtained is tight.

According to a preferred embodiment of the invention, the nonwoven reinforcement is formed by successively carrying out a wefting operation using a continuous weft thread and a warping operation using a continuous warp thread, so as to form small loops or rings for taking up stresses on two lateral edges of the grid with the aid of the weft thread and on two terminal edges of the grid with the aid of the warp thread.

Advantageously into the stress absorption loops on each of the lateral edges and on each of the terminal edges is passed a cable connecting the complex to an adjacent structure and the covering films are not applied to the connecting cables. These characteristics make it possible, e.g. by edge-to-edge stitching of two complexes formed in this way, to ensure the taking up of stresses, substantially without any mechanical discontinuity and no matter what the shape of the complexes. Obviously, the tightness is then maintained by covering the assembly zone (seam) by a ribbon thermoassembled with the two complexes and through which do not pass the structural stresses taken up by the fibres.

It should be noted that the process according to the invention makes it possible to produce complexes, whose distribution density and orientation of the reinforcing threads are organized so as to optimize the stress behaviour of the structure in accordance with a predetermined law, which is dependent on the subsequent use of the complexes.

When it is wished to produce a non-rectangular complex, the wefting operation is carried out by attaching the continuous weft thread to lateral attachment members distributed along the lateral edges of the grid. This is followed by the performance of the warping operation by attaching the continuous warp thread to the end attachment members distributed transversely over a width equal to that of a transverse segment having a greater width than the complex to be produced. The distance between this transverse segment and each of the end attachment members is modified so as to be equal to the final length of the strand corresponding to the warp thread in the complex to be produced. The strands of the warp thread are then locked on each transverse segment of greater width and to a first end of the grid is given its definitive width by maintaining the strands under tension between said first end and said transverse segment. The strands of the warp thread on the transverse segment are then slackened. Finally, the covering films are applied, whilst modifying the spacing of the strands of warp threads as from the first end and by maintaining the strands under tension.

According to a second embodiment of the invention, the nonwoven reinforcement is formed by carrying out a wefting operation by means of a continuous weft thread and then a warping operation by means of separate warp threads, the warping operation and the application of the covering films being carried out simultaneously and continuously and the wefting operation forming stress absorption loops on two lateral edges of the grid is performed with the aid of the weft thread.

Finally, according to a third embodiment of the invention, in simultaneous continuous manner is carried out the production of the nonwoven reinforcement, the preheating and application of the covering films, then nonwoven reinforcement being obtained by continuously carrying out a warping operation and a wefting operation.

The invention also relates to a machine for producing a tight complex incorporating an inner reinforcement and two covering films for said reinforcement comprising warping means and wefting means making it possible to form a nonwoven reinforcement having warp threads and weft threads arranged on two juxtaposed layers in the manner of a grid, means for preheating the covering films to the thermoassembly temperature and complexing means applying the preheated covering films to the nonwoven reinforcement with a predetermined pressure and at a complexing temperature below said thermoassembly temperature and at the most equal to the maximum temperature withstood by the threads, so as to form a tight complex.

It should be noted that the warp and weft threads forming the grid can be independent or thermoassembled.

Finally, the invention relates to a tight complex incorporating an inner reinforcement and two covering films for said reinforcement made from a meltable material, characterized in that the inner reinforcement is a nonwoven reinforcement formed from warp and weft threads arranged on two juxtaposed layers.

Figure 2:
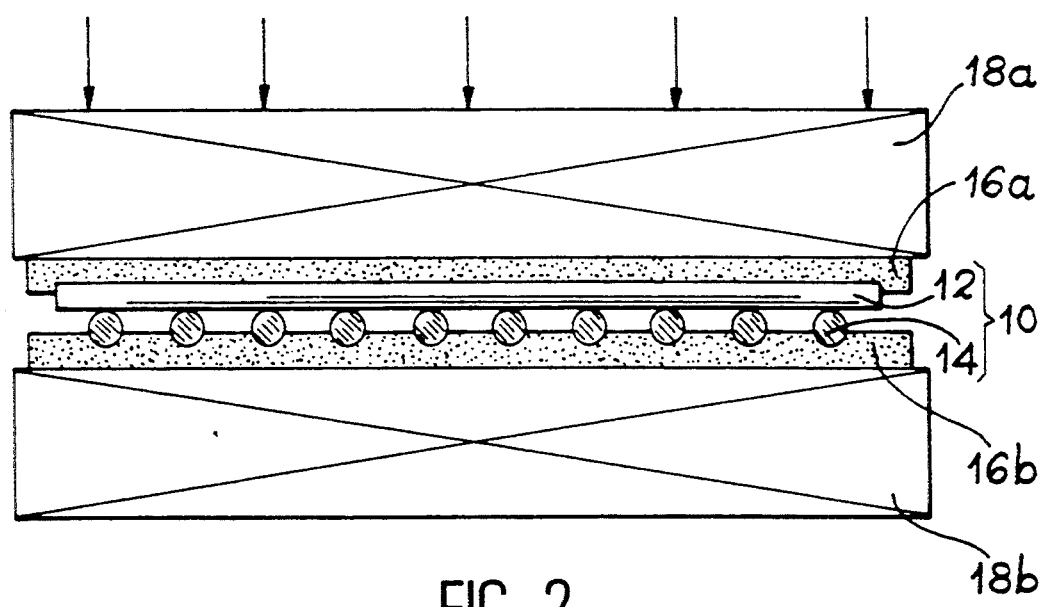

The invention is described in greater detail hereinafter relative to non-limitative embodiments and the attached drawings, wherein show:

FIGS. 1 and 2 diagrammatically showing the production of a tight complex according to the invention by applying two covering films to a nonwoven inner reinforcement.

Figure 3:
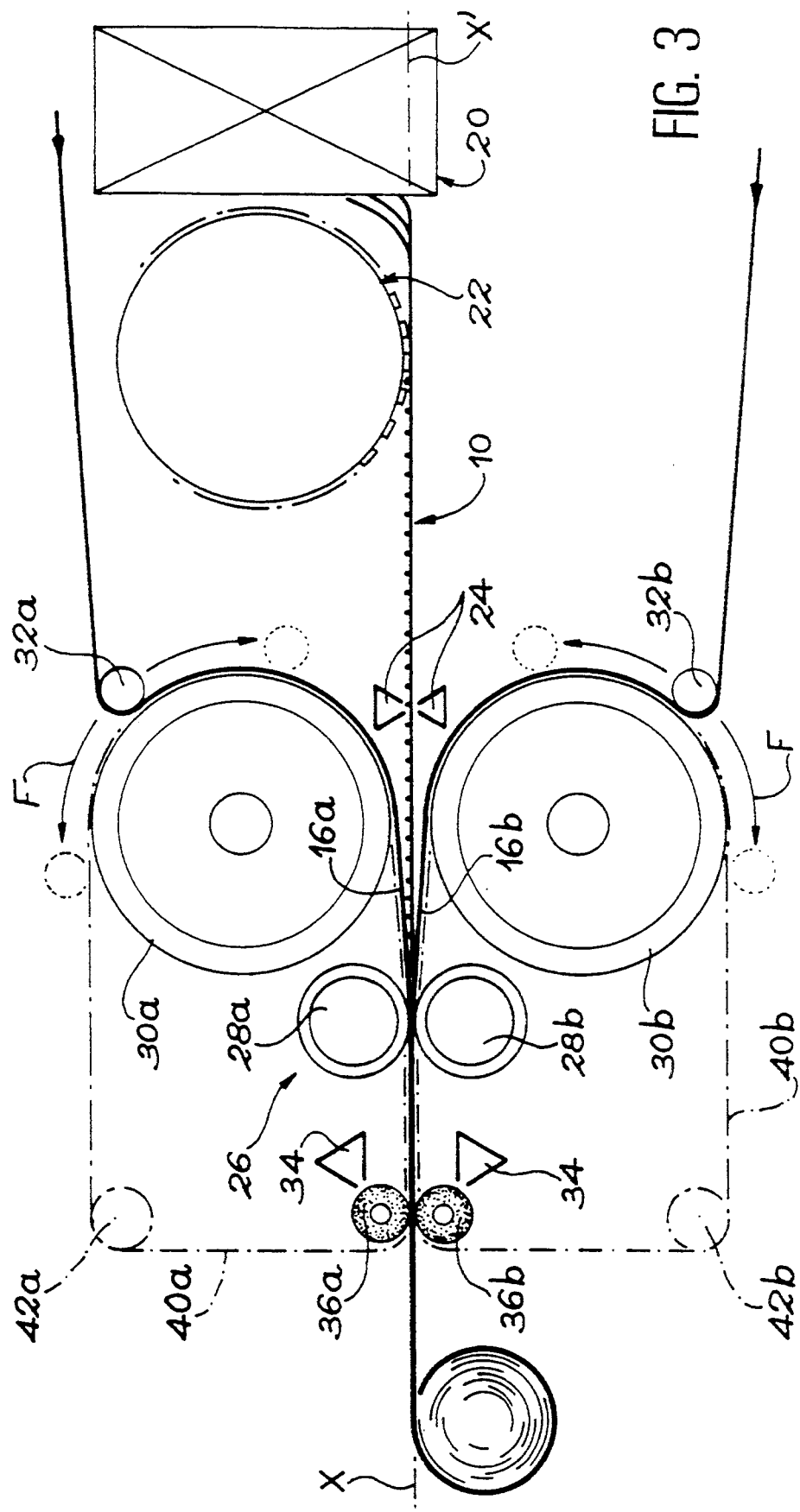

FIG. 3 a front view diagrammatically showing a machine for the continuous production of a tight complex according to an embodiment of the invention.

Figure 4:
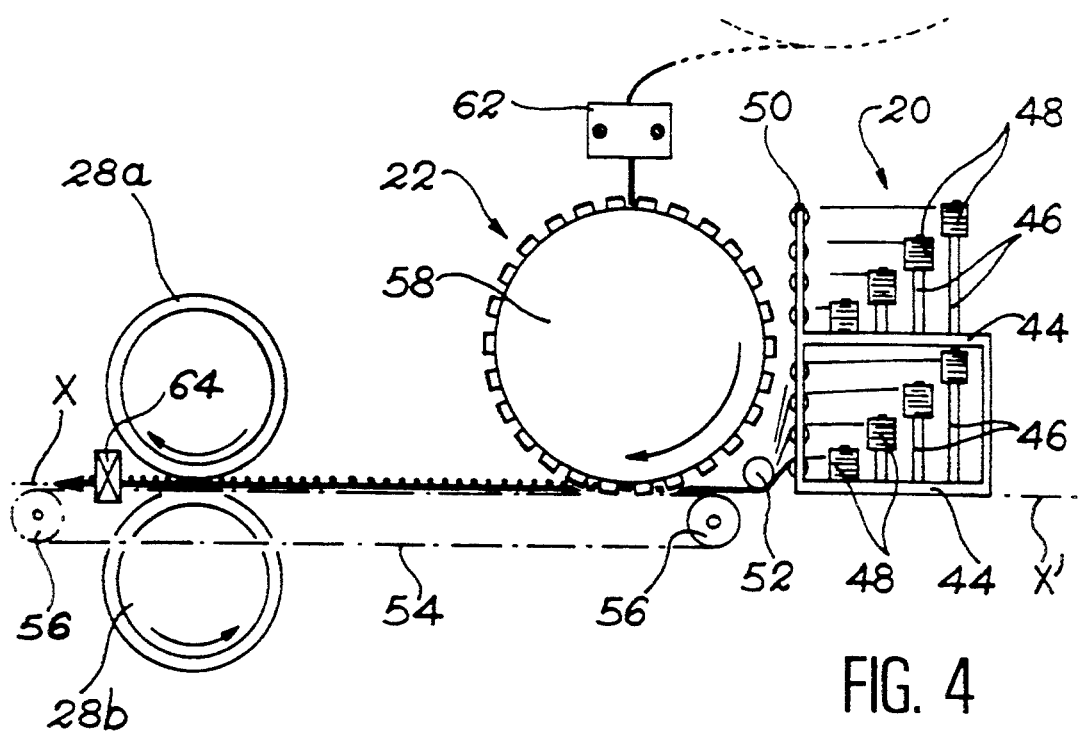

FIG. 4 a front view showing on a larger scale the warping and wefting means of the machine of FIG. 3.

Figure 5:
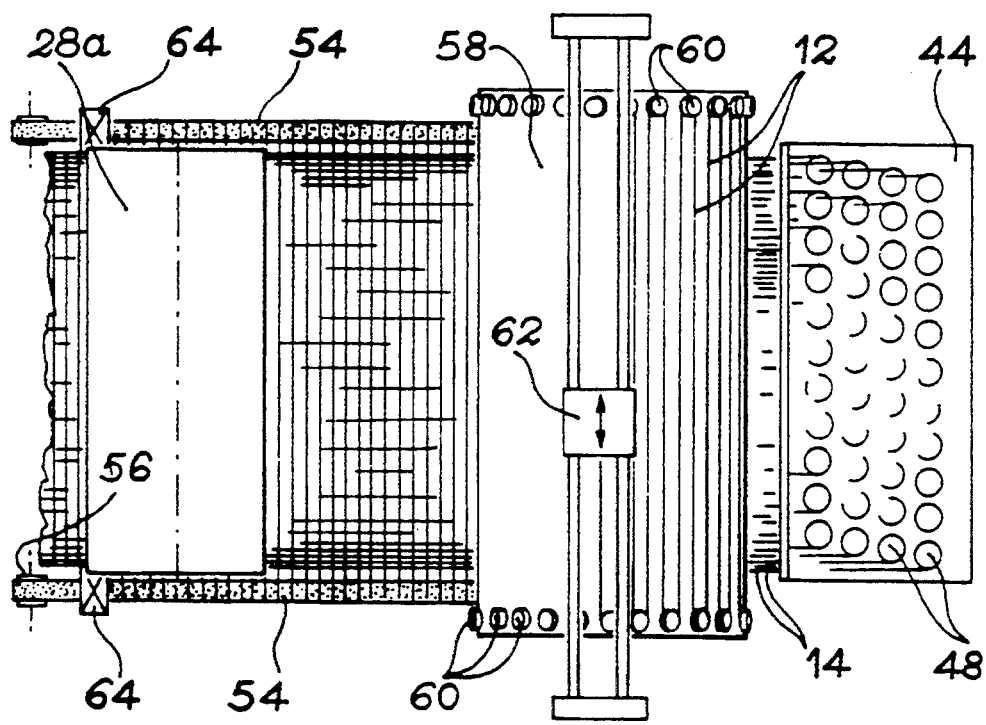

FIG. 5 a plan view of the warping and wefting means illustrated in FIG. 4.

Figure 6:
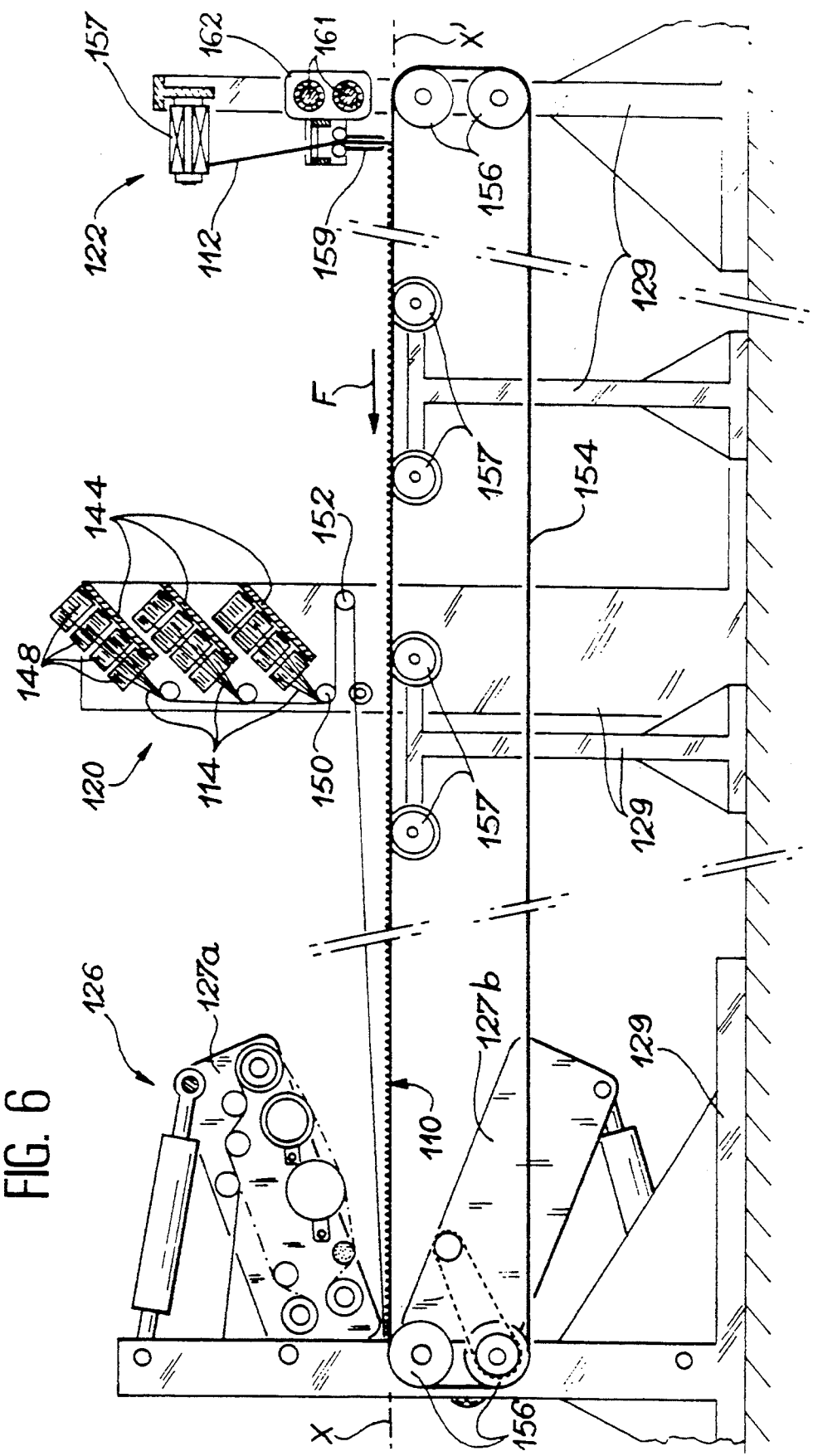

FIG. 6 a front view diagrammatically showing a machine for the continuous production in two successive operations of a tight complex according to another embodiment of the invention.

Figure 7:
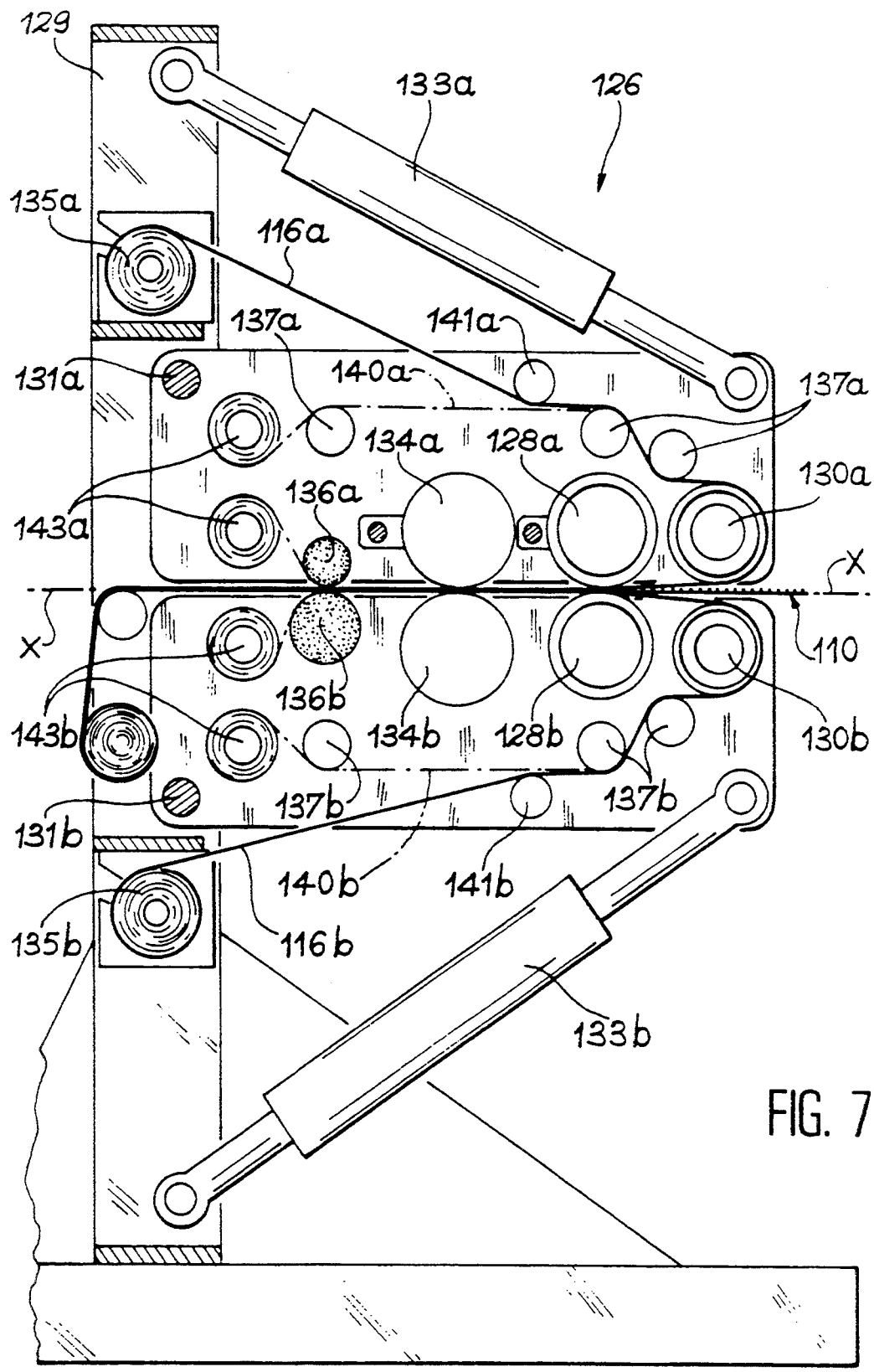

FIG. 7 a front view showing on a larger scale and in the closed position a subassembly of the machine of FIG. 6 in particular containing the complexing means.

Figure 8:
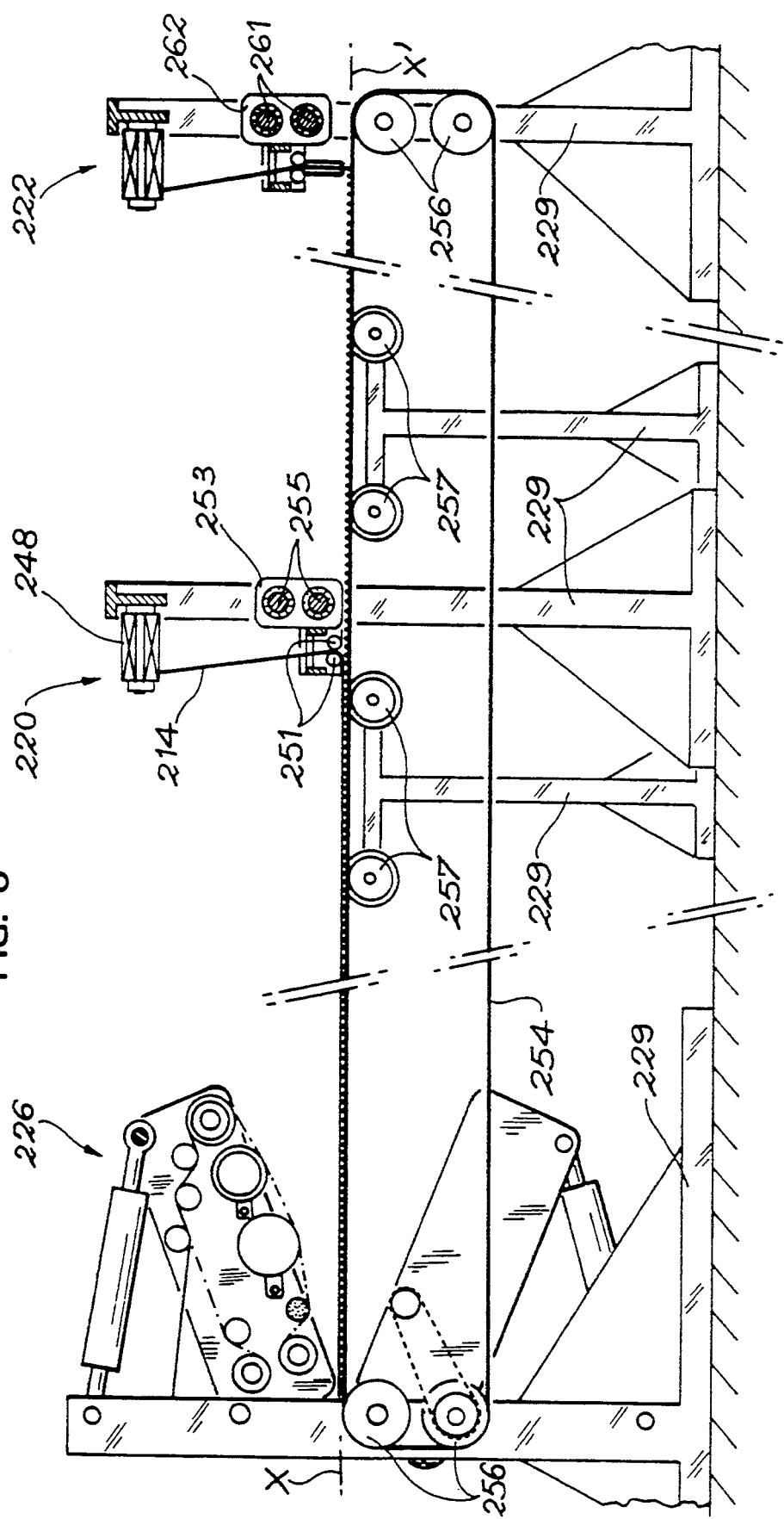

FIG. 8 a comparable view to FIG. 6 illustrating a preferred embodiment of the invention.

Figure 9:
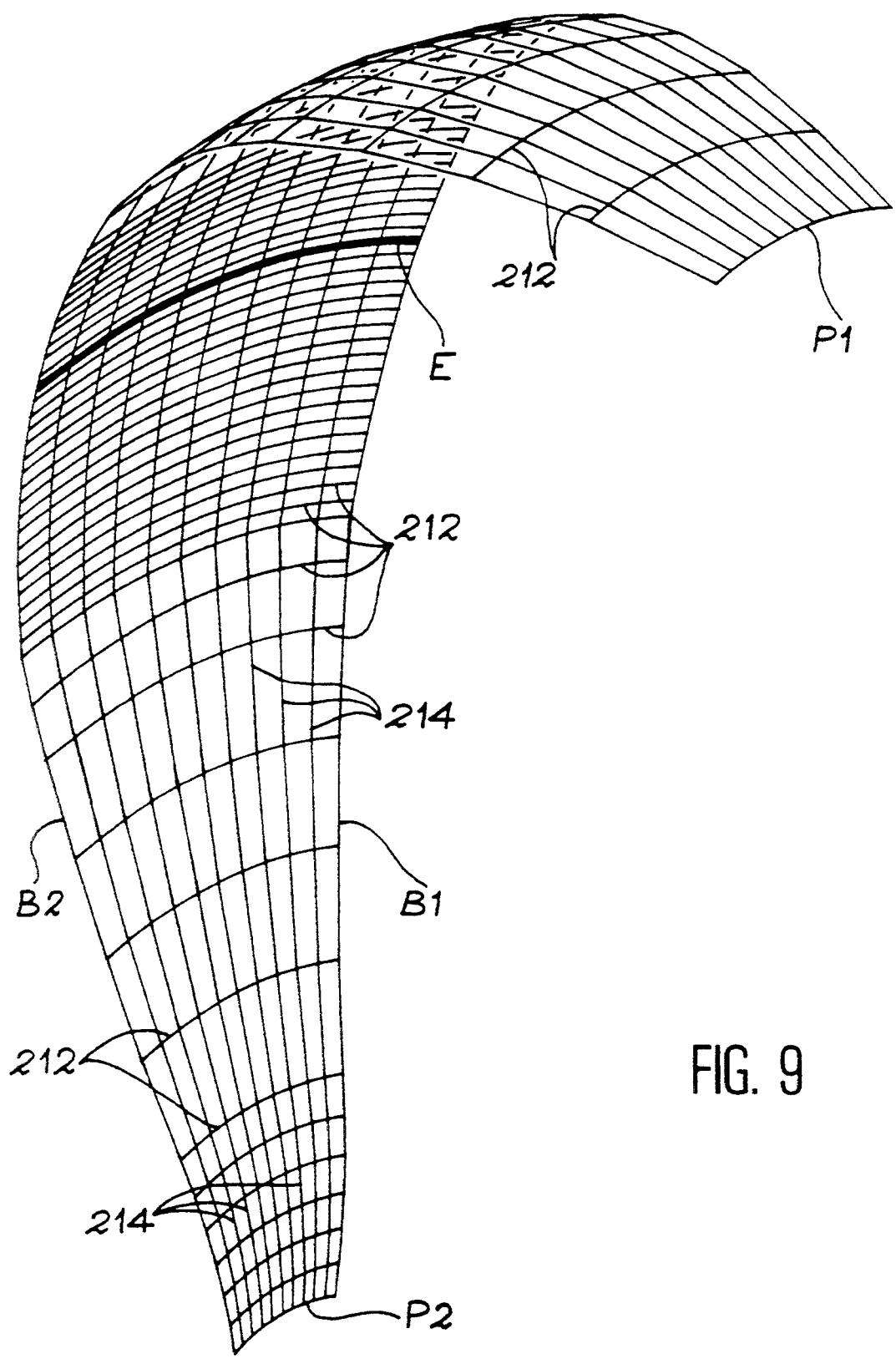

FIG. 9 a perspective view diagrammatically showing the non-rectangular, non-planar complex reinforcement produced with the aid of the machine shown in FIG. 8.

Figure 10:
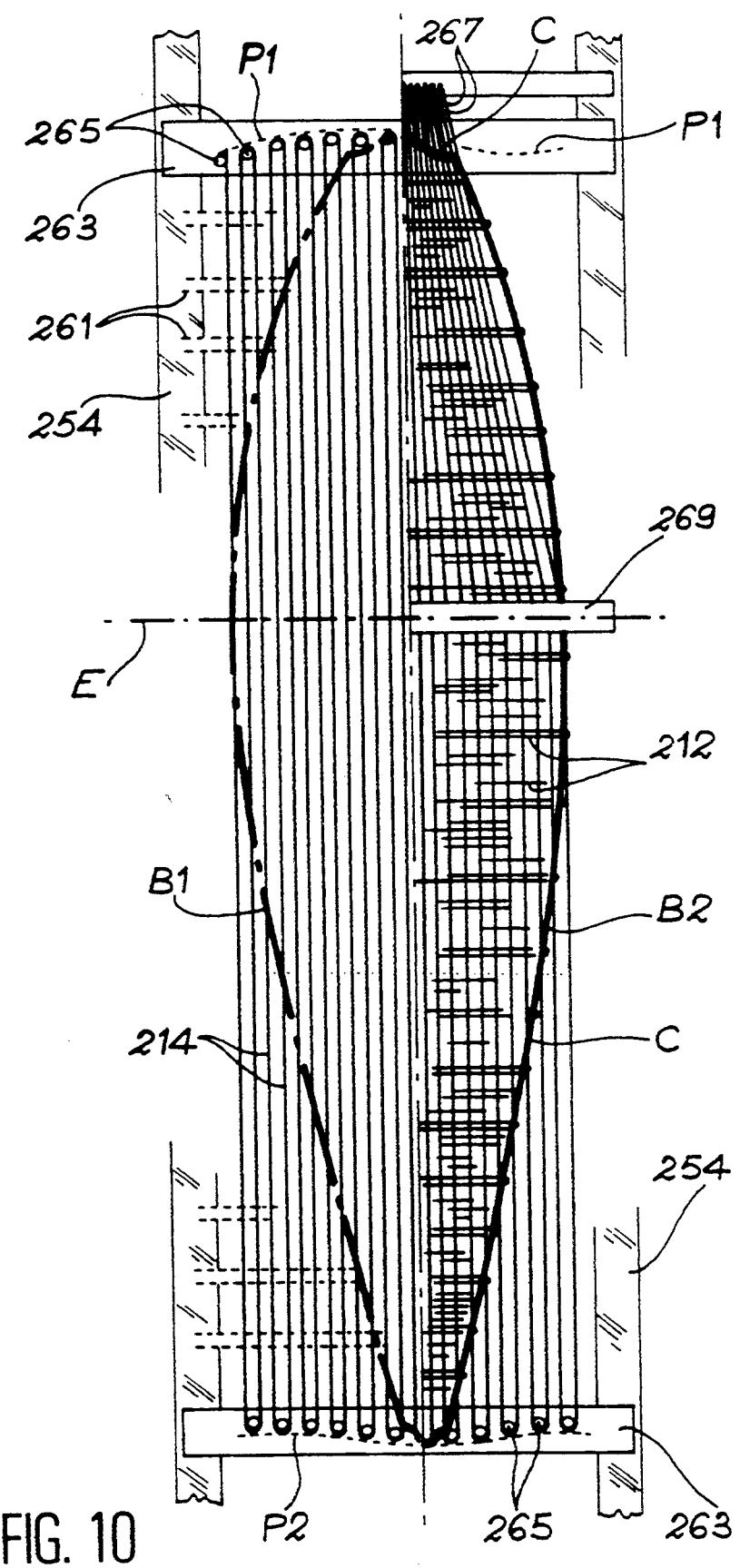

FIG. 10 a plan view of the reinforcement of FIG. 9, on which the left and right-hand portions represent two successive stages in the production of said reinforcement.

Figure 11:
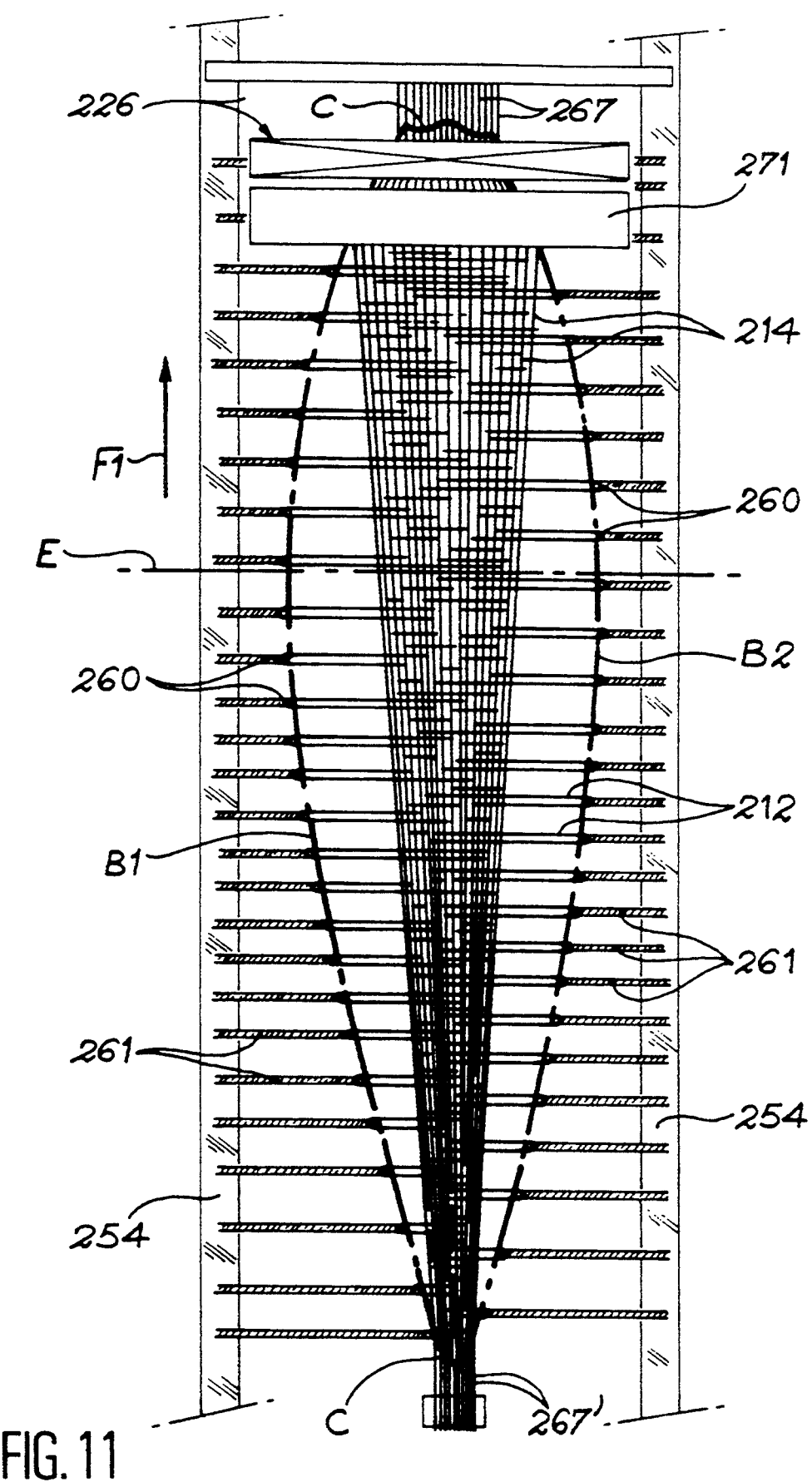

FIG. 11 a view comparable to FIG. 10 illustrating a third stage in the production of the reinforcement.

Figure 12:
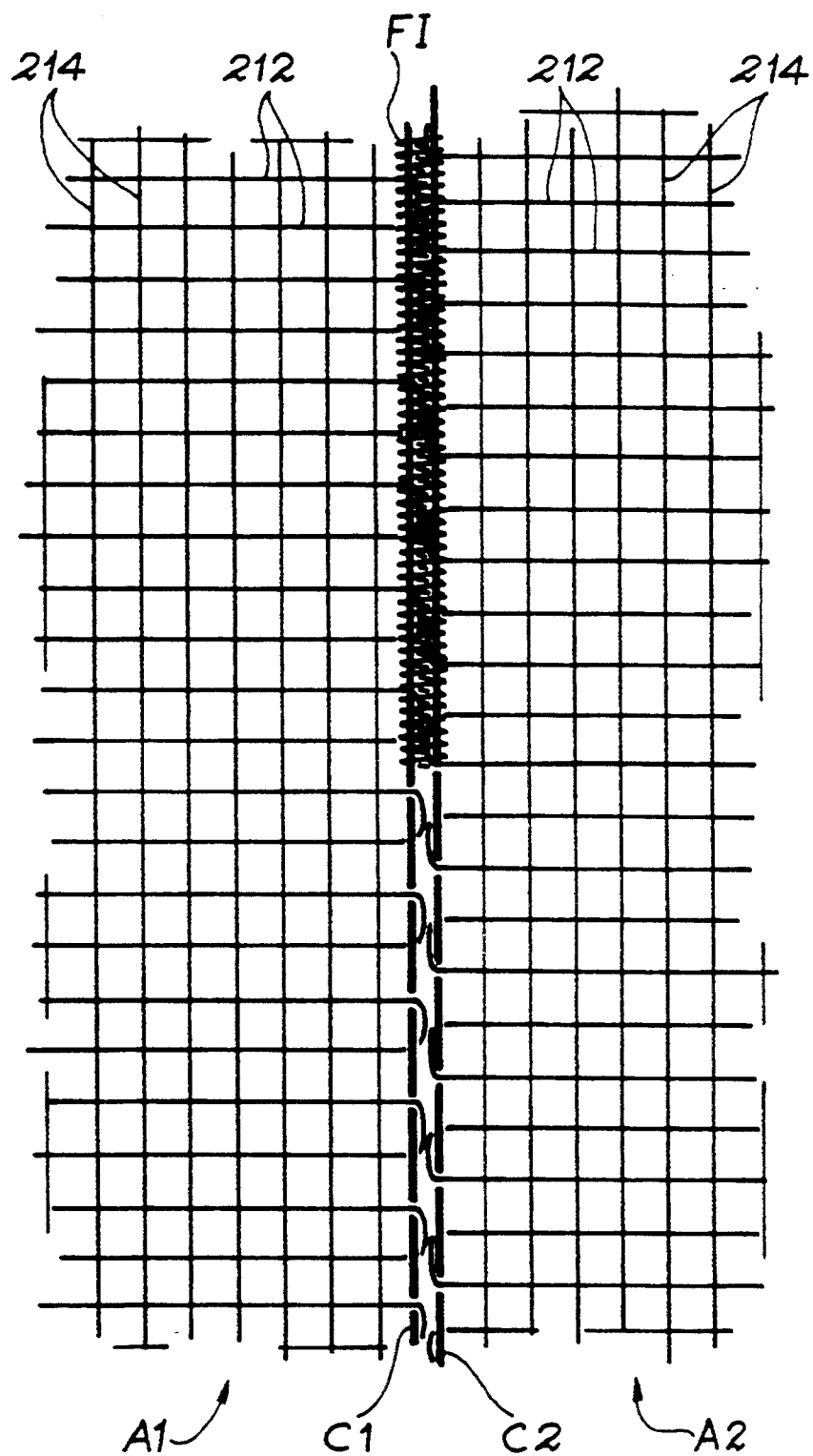

FIG. 12 the assembly by edge-to-edge stitching of two complexes produced according to the invention.

In FIG. 1, reference numeral 10 designates a grid-like inner reinforcement which, according to the invention, is used for producing a tight complex. This reinforcement or framework 10 is formed by weft threads 12 and warp threads 14 in the form of two juxtaposed layers and which intersect e.g. at right angles, but without any interlacing. The warp threads 14 and weft threads 12 are advantageously high strength polyethylene threads such as HP-PE-Dyneema SK60 threads (registered trademark) able to withstand a temperature of max. approximately 110° C. However, they can also be produced from any other material and the material of the weft threads 12 can be identical or different to the material of the warp threads 14. The weft and warp threads 12,14 are welded or bonded to one another at their intersection points, or are simply interconnected by two covering films 16a,16b between which the said threads are placed.

The two covering films 16a,16b of limited thickness are made from a meltable material such as polyethylene and form a tight complex with the reinforcement 10. The pasty melting point of polyethylene is between approximately 120° and approximately 130° C.

In order that the covering films 16a,16b form an entity with the inner reinforcement 10, they are preheated to a temperature at least equal to their pasty melting point before being brought into contact with the threads of the inner reinforcement 10, between the two parts 18a,18b of a heating press very diagrammatically shown in FIG. 1. If the covering films are made from polyethylene, they are preheated e.g. to approximately 140° C.

The two parts 18a,18b of the heating press are heated to a complexing temperature below the melting point of the covering films 16a,16b and at the most equal to the maximum temperature withstood by the weft and warp threads 12,14. When the warp and weft threads are constituted by high strength polyethylene threads, the parts 18a,18b are e.g. heated to approximately 110° C., which ensures that these threads are not heated to a temperature above the limit temperature not to be exceeded for such threads, so that they maintain their stress performance characteristics.

As is very diagrammatically illustrated in FIG. 2, the heating press constituted by the parts 18a,18b makes it possible to apply to the assembly formed by the two covering films 16a,16b and by the nonwoven reinforcement 10 placed between them a predetermined force. This force is chosen so that the covering films 16a,16b kept in a melted state by the two parts 18a,18b, penetrate between the weft threads 12 and between the warp threads 14 to a sufficient extent to give the assembly the desired cohesion. However, this force is inadequate for allowing the covering films 16a,16b to be completely traversed by the weft threads 12 and warp threads 14 respectively. Therefore the quality of the seal of the thus obtained complex is ensured and the strength performance characteristics of the weft and warp threads 12,14 are preserved.

A first embodiment of a machine making it possible to continuously produce such a tight complex will now be described with reference to FIGS. 3 to 5. The arrangement of the film shown in FIG. 3 is such that the tight complex is produced in a horizontal plane X X' in FIG. 3 and passing from the right to the left of the latter.

Thus, the machine according to the invention successively comprises, starting from the right, warping means 20 and wefting means 22 making it possible to form a grid constituted by nonwoven warp threads 14 and weft threads 12 in the form of two superimposed, crossed layers. This grid moves continuously to the left in the plane X X' and passes in front of blowing rods 24, which weld the threads 12,14 at their intersection points so as to form a nonwoven reinforcement.

When the warp and weft threads are high strength polyethylene threads not withstanding a temperature exceeding 110° C., the blowing rods 24 blow air at a temperature of approximately 90° C., which permits the welding of the threads without them losing their performance characteristics. The blowing rods 24 can be eliminated, or can be replaced by bonding means for the threads 12,14 without passing outside the scope of the invention.

On leaving the blowing rods 24, the nonwoven reinforcement 10 continues to travel to the left in FIG. 3 in order to arrive at the complexing means 26. The latter comprise two heating rollers 28a, 28b, which are pressed against one another with a predetermined force using appropriate, not shown means. These heating rollers are arranged in such a way that they are tangential to one another along the plane X X' and their axes, parallel to said plane, are perpendicular to the advance direction of the reinforcement 10 in the plane X X'. The heating rollers 28a,28b make it possible to apply with said predetermined force a covering film 16a,16b to each of the faces of the nonwoven reinforcement 10, i.e. they fulfil the function of the parts 18a,18b in FIGS. 1 and 2.

Before being pressed against the inner reinforcement 10, each of the covering films 16a,16b travels respectively on a heating drum 30a,30b positioned approximately between the blowing rods 24 and the heating rollers 28a,28b. The heating drums 30a,30b have the same diameter, which significantly exceeds the diameter of the heating rollers 28a,28b and their axes are arranged symmetrically to the plane X X' and are oriented parallel to the axes of the heating rollers. Moreover, the heating drums 30a,30b are slightly spaced from the plane X X', so that the covering films 16a,16b only come into contact with the reinforcement 10 to the right of the heating rollers 20a,20b.

Each of the covering films 16a,16b is brought into contact with the heating drum 30a,30b by a return roller 32a,32b respectively. The corresponding covering film reaches the return roller from a not shown storage roller located to the right of the machine when considering FIG. 3.

As is diagrammatically illustrated in FIG. 3 (arrows F), the positions of the return rollers 32a,32b with respect to the heating drums 30a,30b can be regulated, so that the length of the path covered by each of the covering films 16a,16b in contact with the heating drum corresponding thereto can vary. This regulation or setting is such that the distance between each return roller and the corresponding heating drum remains constant. In other words, the regulation of the position of the return rollers 32a,32b makes it possible to apply the covering films 16a,16b to zones of the heating drums 30a,30b which, in section, form circular arcs having variable lengths and which can e.g. vary between approximately 30° and approximately 180°.

The latter characteristic, combined with the heating of each of the drums 30a,30b to a controlled temperature, e.g. approximately 140° C., which is at least equal to the melting point of the material, such as polyethylene used for forming the covering films 16a,16b, makes it possible to bring said films into a pasty melting state when they leave the heating drums 30a,30b in order to move towards the heating rollers 28a,28b. By heating the latter rollers to a temperature e.g. close to 110° C., it is thus possible to accurately control the temperature at which the covering films are located when they are applied to the inner reinforcement to the right of the complexing means 26.

As a variant, the films 16a,16b are produced from a non-heat weldable material. The complexing means 26 can then comprise, upstream of the heating drums 30a,30b, means for applying to the covering films 16a,16b a glue or adhesive which can be thermally reactivated, or the two components of an epoxy-type adhesive. The heating of the films 16a,16b by the drums 30a,30b then makes it possible to reach the thermobonding or evaporation temperature of the adhesive.

Downstream of the heating rollers 28a,28b, i.e. to the left of the latter when considering FIG. 3, the thus formed tight complex passes in front of cooling nozzles 34 and then between pressure rollers 36a,36b, which move the complex and the various elements forming it to the left on considering FIG. 3. The pressure rollers 36a,36b are in contact with one another via the tight complex, along the plane X X' and their axes are oriented parallel to the axes of the heating rollers 28a,28b and the heating drums 30a,30b. At least one of the pressure rollers 36 is rotated at an optionally regulatable, constant speed by a not shown geared motor.

Downstream of the pressure rollers 36, the thus produced tight complex is wound onto an interchangeable storage roller 38 arranged tangentially to the plane X X' and whose axis is also parallel to the axes of the rollers 28a,28b.

As is shown by the broken lines in FIG. 3, the machine briefly described hereinbefore is advantageously completed by two continuous conveyor belts 40a,40b. The conveyor belt 40a travels on the upper pressure roller 36a, on the upper heating roller 28a, on the upper heating drum 30a and on a fixed return roller 42a, whose axis is approximately located in the same vertical plane as the axes of the pressure rollers 36a,36b. The continuous conveyor belt 40b travels on the lower pressure roller 36b, on the lower heating roller 28b, on the lower heating drum 30b and on the fixed return roller 42b arranged symmetrically to the fixed roller 42a with respect to the plane X X'. These continuous conveyor belts 40a,40b make it possible to convey under optimum conditions the covering films 16a,16b between the heating drums 30a,30b and the heating rollers 28a,28b, when said films are in the pasty melted state.

The warping means 20 and wefting means 22 will now be described in greater detail with reference to FIGS. 4 and 5.

The warping means 20 comprise one or more horizontal sinkers 44 (two in the embodiment shown), each supporting vertical spindles 46 arranged in rows and slightly displaced between the individual rows, the length of the spindles 46 decreasing from the right to the left. Each of the spindles 46 receives in a rotary manner a thread bobbin 48 for forming the warp threads 14 of the central reinforcement of the tight complex.

Therefore the thread bobbins 48 are arranged in accordance with a regular network, so that the threads from the bobbins travel parallel to one another and in a horizontal direction up to an orifice or roller of a vertical grid 50. To the left of the grid 50 and level with the lowest sinker 44, each of the threads 14 from the bobbins 48 and which has traversed the grid 50 passes onto a return pulley 52. All the return pulleys 52 have the same axis, which is oriented perpendicular to the thread advance direction in the plane X X', the return pulleys 52 also being tangential to said plane and placed above the latter.

To the left of the return pulleys 52, the plane X X' is materialized by the upper face of a transfer belt 54, which passes between the two rollers 56 respectively placed slightly downstream of the return pulleys 52 and slightly downstream of the pressure rollers 28a,28b.

The wefting means 22, placed slightly downstream of the return pulleys 52, comprise a rotary wefting drum 58 placed above the transfer belt 54 and tangentially to the latter in such a way that its axis is oriented perpendicular to the thread advance direction. As is more specifically illustrated by FIG. 5, said rotary wefting drum 58 has at each of its ends a series of studs 60 on which a wefting shuttle 62, which performs a reciprocating movement above the upper generatrix of the wefting drum 58, attaches the weft thread 12 parallel to the generatrixes of the roller 58.

When the weft threads 12 reach the transfer belt 54 after carrying out a half-turn on the wefting drum 58, they are cut in the immediate vicinity of the studs 60 and attached to the transfer belt 54, e.g. using an adhesive, as well as an appropriate, not shown device.

After the covering films 16a,16b, the warp threads 14 and the weft threads 12 have been complexed by the heating rollers 28a,28b, devices 64 cut the edges of the thus formed complex.

If the nature of the tight panel or envelope to be produced justifies it, the warp threads 14 can be positioned in accordance with zig-zag lines with the aid of an appropriate, not shown device positioned between the wefting drum 58 and the blowing rods 24.

The embodiment described hereinbefore with reference to FIGS. 3 to 5 relates to a machine in which the warping, wefting, welding or bonding of the warp and weft threads, the deposition of the covering films on the reinforcement formed in this way and the complexing of the assembly are carried out continuously in a single operation.

In a second embodiment diagrammatically illustrated in FIG. 6, the machine firstly carries out the continuous wefting and then the warping, deposition of the covering films and complexing. This second series of operations is also performed continuously.

The components of the machine illustrated in FIG. 6 corresponding to those of the machine described relative to FIGS. 3 to 5 are designated by the same reference numerals, increased by 100.

The machine of FIG. 6 comprises a frame 129, which is in several parts and which supports two sets of four drive rollers 156, the rollers of the two sets being coaxial and arranged on either side of a central production zone for the complex at the two ends of the machine. Each of these two sets of rollers 156 supports an endless transfer belt 154, whose upper strand defines the horizontal working plane X X'. A not shown geared motor rotates one of the rollers 156 of each set. Between the rollers 156, the upper strand of each transfer belt 154 is guided by intermediate rollers 157 mounted on modular parts of the frame 129.

On passing from one end to the other of the machine, e.g. from the right to the left in FIG. 7, different modular parts of the frame 129 support a wefting subassembly 122, a warping subassembly 120 and a complexing subassembly 126.

The wefting subassembly 122 has a single, horizontally axed bobbin 157 supported by the corresponding part of the frame 129 and a vertical guide 159 mounted on a carriage 162 able to perform a transverse reciprocating movement on two columns 161 joined to the frame and whose axes are parallel to those of the rollers 156.

During the operation of the wefting subassembly 122, the transverse reciprocating movement of the carriage 162 is accompanied by an advance of the transfer belts 154, e.g. in the direction of the arrow F1 in FIG. 6. On each of the lateral edges of the complex being formed, the single weft thread 112 supplied by the bobbin 157 is e.g. attached to not shown, regularly spaced rods, which project to the top over the transfer belts 154, in the case where the complex has a triangular shape. The combined movements of the carriage 162 and the transfer belts 154 thus make it possible to produce the weft of the complex over a length corresponding to that which it is desired to give to the latter, the machine advantageously having a modular character making it possible to vary said length using the number of parts of the frame 129 carrying the intermediate rollers 157 which is necessary.

The stress absorption loops formed by the weft thread on the lateral edges of the grid being produced make it possible to reinforce these lateral edges by means of lateral stress absorption cables.

The latter are threaded into the loops of the weft thread either manually, or by an appropriate, not shown mechanism. They are e.g. in the form of a thread having the same nature as the warp and weft threads, but which has a larger cross-section, or in the form of braided threads identical to the warp and weft threads.

It should be noted that the machine of FIG. 6 also makes it possible to produce non-rectangular complexes. In this case, the rods used for attaching the weft thread 112 are no longer located directly on the transfer belts 156 and are instead located on components fixed to these belts and maintained in the plane X X', up to the attachment of the weft thread, by a not shown, conveyor belt placed between the belts 154.

The warping means 120 also have several sinkers 144 integral with the corresponding part of the frame 129 and carrying the same number of bobbins 148 as the complex to be produced has warp threads 114. On removal from the corresponding bobbin 148, each of the warp threads 114 passes onto two return pulleys 150,152, its end being attached to a not shown, transverse bar fixed by its ends to the transfer belts 154.

The complexing subassembly 126 will now be described with reference to FIG. 7. It comprises two blocks 127a,127b articulated to the corresponding part of the frame 129 on either side of the plane X X' by two spindles 131a,131b parallel to said plane and oriented in a direction orthogonal to the advance direction of the nonwoven reinforcement 110. Jacks 133a,133b, placed between the frame 129 and each of the blocks 127a,127b, make it possible to pivot the latter about spindles 131a,131b between an open position (FIG. 6) in which the facing faces of the blocks 127a,127b are spaced from one another, and a closed position (FIG. 7), in which said faces are tangential to the plane XX'.

On either side of the plane XX', the frame 129 carries a storage roller 135a,135b, whose axis is parallel to the spindles 131a,131b and from which can be unwound a covering film 116a,116b respectively.

Within each of the blocks 127a,127b, the corresponding covering film 116a,116b is engaged against a conveyor belt 140a,140b by a return roller 141a,141b. The ends of each conveyor belt 140a,140b are wound onto two bobbins 143a,143b mounted in the corresponding block 127a,127b. From the bobbin 143a,143b furthest removed from the plane XX', each of the conveyor belts 140a,140b successively passes onto return rollers 137a,137b, onto a heating drum 130a,130b, onto a heating roller 128a,128b, onto a cooling roller 134a,134b and onto a drive roller 136a,136b.

These return rollers 141a,141b apply the covering films 116a,116b to the conveyor belts 140a,140b between the return rollers 137a, 137b. When the blocks 127a,127b are in their closed position, the covering films 116a,116b are engaged on the reinforcement 10 located in the plane XX' between the heating rollers 128a,128b and the drive rollers 136a,136b. In addition, the heating rollers 128a,128b, the cooling rollers 134a,134b and the drive rollers 136a,136b are tangential along plane XX'.

The spindles of the heating roller 128b and the cooling roller 134b mounted in the lower block 127b are fixed, whereas the spindles of the heating roller 128a and cooling roller 134a mounted in the upper block 127a are mobile and are elastically moved downwards with a predetermined force by not shown elastic systems, such as springs or jacks. Moreover, the spindles of all the rollers carried by the blocks 127a,127b are parallel to the hinge pins or spindles 131a,131b of the latter.

Before being pressed against the inner reinforcement 110, the covering films 116a,116b are heated on the heating drums 130a,130b, which are slightly spaced from the plane XX', so that the covering films 116a,116b only come into contact with the inner reinforcement 110 to the right of the heating rollers 128a,128b.

As in the first embodiment, the heating drums 130a,130b can also be used for the thermobonding or evaporation of an adhesive previously deposited on the films 116a,116b.

During the wefting phase, the complexing subassembly 126 is open and the warping subassembly is stopped. When wefting is ended, the ends of the warp threads 114 are attached to the aforementioned transverse bar and the complexing subassembly 126 is closed. The warping and complexing operations are then performed by again controlling the advance of the transfer belts 154 in the direction of the arrow F1 and the putting into operation of the different heating and cooling means contained within the complexing means 126.

As illustrated in FIG. 6, in this second embodiment of the invention, the warp threads 114 are brought into contact with the weft threads 112, at the same time as the covering films 116a,116b, by the heating rollers of the complexing subassembly 126. Consequently, the formation of the grid and the complexing of the assembly are simultaneous.

In the case where the complex to be produced is rectangular, the warp threads are all parallel to the advance direction of the transfer belts 154, so that the complex is directly obtained by carrying out the operation described hereinbefore.

In the case where the complex is not rectangular, the parallelism of the warp threads no longer exists. Consequently, it is then necessary to laterally position each of the warp threads 114 just prior to carrying out complexing. For this purpose, it is possible to add to the machine illustrated in FIG. 6 a not shown reed or comb having teeth, whose spacing varies during the advance of the transfer belts 154, in accordance with a program determined as a function of the shape of the complex to be produced. This reed is placed between the warping means 120 and the complexing means 126.

It should also be noted that a reed can be used in the case of a rectangular or a non-rectangular complex, if it is desired to distribute the warp threads in accordance with a given law, so as to optimize the behaviour of the stresses on the finished panel or envelope, when the stress distribution is not homogeneous.

In the embodiment described hereinbefore relative to FIGS. 6 and 7, the weft of the complex is produced from an uncut, single thread, which forms loops on each of the lateral edges of the complex. The connecting cable introduced manually or mechanically into these loops makes it possible to connect several complexes edge-to-edge by stitching, whilst ensuring the taking up of the stresses withstood by the warp threads, so as to form a complete envelope. To this end, the covering sheets do not cover the connecting cables. However, the warp of the complex is formed from separate warp threads, so that the taking up of the stresses at the ends of the complex is difficult to carry out.

The machine which will now be described with reference to FIG. 8 obviates this disadvantage by separating the wefting operations, the warping operations and the complexing operations. As a result of this separation, it becomes possible to carry out warping with the aid of a single thread in the same way as wefting. The stresses can then be taken up without difficulty both on the warp threads and on the weft threads of the complex.

Specifically, the machine illustrated in FIG. 8 only differs from that of FIG. 6 through the warping means. In order to facilitate understanding, components comparable to those of the machine of FIG. 6 are designated by the same reference numerals, increased by 100.

As in the preceding machine, a frame 229 formed from several modular parts supports two lateral, endless transfer belts 254, via drive rollers 256 and intermediate rollers 257. Along the upper plane XX' defined by the belts 254, from right to left, the frame 229 carries a wefting subassembly 222, a warping subassembly 220 and a complexing subassembly 226.

The wefting subassembly 222 and complexing subassembly 226 are identical to those of the machine of FIG. 6. For further details concerning these subassemblies, reference should be made to the preceding description.

With regards to the warping subassembly 220, it comprises a single bobbin 248, whose horizontal spindle is supported by the corresponding part of the frame 229. On leaving said bobbin 248, the single warp thread 214 passes between two pulleys 251 carried by a carriage 253 mounted in sliding manner on two transverse columns 255 integral with the frame 229.

When carrying out warping, which preferably takes place after wefting, the transfer belts 254 perform a reciprocating movement over a distance corresponding to the length of the complex to be produced. Simultaneously, the carriage 253 travels progressively from one edge to the other of the complex. These two combined movements lead to the continuous performance of warping of the entire surface of the complex.

To ensure that the warp thread 214 remains attached to the ends of the complex whenever the displacement direction of the transfer belts 254 is reversed, the latter support, at locations corresponding to the ends of the complex, not shown, transverse attachment bars. Each of these bars carries not shown rods, regularly spaced by warp threads and which project upwards from the corresponding bar. Whenever the displacement direction of the belts 254 is reversed, the warp thread 214 passes around one of these rods and is attached there without any interruption to the continuity of the warp thread.

When warping is finished, terminal stress absorption cables are threaded into the small loops formed by the warp thread at the ends of the grid. The nature of these cables and their realization are identical to those of the lateral stress absorption cable introduced into the loops formed by the weft thread.

When wefting and warping have been carried out, the previously open complexing means 226 are closed and complexing is performed.

The machine described hereinbefore with reference to FIG. 8 makes it possible to produce a complex, whose warp and weft threads are produced from single, uncut threads forming small loops on the lateral edges and at the ends of the complex. It is therefore possible, on the basis of several complexes assembled by stitching, to form an envelope or panel in which the stresses withstood by the warp and weft threads can be entirely absorbed. The mechanical strength characteristics of said envelope or panel are consequently optimized. Moreover, the machine of FIG. 8 makes it possible to produce complexes having a random shape, i.e. rectangular, spherical lune-shaped, triangular, etc.

The production of a rectangular complex calls for no particular comment. Thus, it is obtained simply by using the machine in the manner described hereinbefore. The production of a non-rectangular and non-planar complex will now be described relative to FIGS. 9 to 11.

FIG. 9 shows in perspective the reinforcement of a complex, whereof certain strands of a single weft thread are designated by the reference 212 and certain strands of a single warp thread are designated by the reference 214. In order to facilitate the understanding of the drawing only certain of the strands of these two threads are shown. Moreover, the lateral edges are designated by the references B1 and B2 and the terminal edges or poles by the references P1 and P2. In addition, the widest transverse segment or equator is designated by the reference E.

Prior to the production of such a complex a computer is used for calculating the length of each of the strands 212,214 of the weft and warp threads in the complex to be produced. The thus measured lengths are brought into a plane by calculation, by disposing all the strands 212 of the weft thread parallel to a transverse direction and all the strands 214 of the warp thread parallel to a longitudinal direction. The weft thread strands 212 are then limited by lateral edges B1,B2 brought into the plane and the warp thread strands 214 are limited at their ends by the poles P1,P2 brought into the plane and extending over the width of the equator E, as illustrated in FIG. 10.

On the basis of these theoretical data, the machine of FIG. 8 is equipped with attachment rods 260 (FIG. 11), which are positioned in the plane XX' in accordance with curves formed by the lateral edges B1,B2 brought into said plane. These rods 260 project upwards at the end of flexible strips 261, whose opposite ends are fixed to the transfer belts 254. The number of rods 260 and strips 261 has been deliberately reduced in FIG. 11 in order not to make its understanding more difficult. Up to the attachment of the weft thread 212 to said rods 260, the strips 261 are supported in the plane XX' by a not shown conveyor belt or any equivalent means.

At locations corresponding to the ends of the complex to be produced, the machine of FIG. 8 is equipped with two transverse bars 263, whose ends are fixed to the transfer belts 254 (see FIG. 10). Rods 265 project over the upper face of each of these bars 263, in accordance with curves formed by the poles P1,P2, brought into the plane and extending over the width of the equator E.

Wefting is carried out in the manner described hereinbefore by attaching the weft thread 212 to each of the rods 260. If appropriate, a suitable program makes it possible to limit the reciprocating movements of the carriage 262 on the columns 261 (FIG. 8).

The warp thread 214 is then put into place on the rods 265, as illustrated in the left-hand part of FIG. 10, by actuating the warping subassembly 220.

Connecting cables, like the cable C illustrated in the right-hand part of FIG. 10 are placed in the small loops formed in this way on the edges B1,B2 and along the poles P1,P2. To the cable C placed along the pole P1 are then attached positioning and tensioning threads 267, after locking the warp thread 214 level with the equator E, e.g. by jamming it between two transverse bars 269 (to the right in FIG. 10).

The threads 267 are then tensioned on moving them together, so as to give the pole P1 its final width. When this operation is ended, as shown to the right in FIG. 10, the taut threads 267 are locked and the equator E is freed. Each of the strands of the warp thread 214 is then maintained under tension by positioning and tensioning threads 267' (FIG. 11), attached to the connecting cable C placed along the pole P2.

As illustrated in FIG. 11, the complexing can then be carried out with the aid of the complexing subassembly 226. Immediately upstream of this subassembly, considering the movement direction F1 of the reinforcement, is located a reed 271, which is provided with not shown teeth which, in accordance with a predetermined program, modify the spacing between the strands of the warp thread 214, so that these strands are distributed over the entire width of the complex, from one end to the other thereof, in accordance with a predetermined law.

The displacement program for the teeth of the reed 271 takes account of the displacement existing between the same and the complexing subassembly 226. Moreover, upstream of said subassembly, the strands of the warp thread 214 are located in a plane which is displaced upwards with respect to the plane containing the strands of the weft thread 212, which makes it possible to avoid any interaction between the reed and the latter.

Moreover, the complexing subassembly is advantageously equipped with means for the lateral cutting of the covering films in accordance with a predetermined program, so that to the reinforcement are only applied widths of films corresponding to the width of the complex at the location in question. This width is such that it does not cover the lateral loops in which have been placed the connecting cable C.

Thus and as is illustrated in FIG. 12, it is possible to connect edge-to-edge two complexes A1 and A2 produced in the manner described hereinbefore by means of a stitching thread F1. The nature of this stitching thread is preferably the same as that of the warp and weft threads forming the reinforcement of the complexes. This stitching thread surrounds the lateral loops formed by the weft threads of the two complexes, as well as the connecting cables C1,C2 placed in these loops. The stresses withstood by one of the complexes are consequently integrally transmitted to the other.

The sealing of the assemblies is obtained by placing on each of the seams a tight ribbon, which is welded or bonded to the films 116a,116b. The structural stresses taken up by the threads do not pass through the said ribbon and instead pass through the cables C1 and C2.

The presence of small loops on the lateral edges and terminal edges of the complexes makes it possible to produce tight panels and envelopes having random shapes and able to withstand high mechanical stresses, which may or may not be homogeneously distributed. Thus, the loops and the connecting cables placed therein ensure the total absorption of the stresses withstood by the reinforcement of each of the complexes.

Obviously, the invention is not limited to the embodiment described hereinbefore and in fact covers all variants thereof. Thus, as shown, the materials constituting the weft and warp threads of the reinforcement can be the same or different. Moreover, the nature and thickness of the materials constituting the covering films ensuring the sealing of the complex obtained can vary without passing outside the scope of the invention. The invention also covers constructions of the complexes in which interface products, such as adhesives, are used between the interwoven fibres and/or between the films and said fibres.

Furthermore, the machine according to the invention makes it possible to produce complexes, which may or may not be provided with stress absorption loops on their lateral and/or end arms and in which the distribution of the warp and/or weft threads corresponds to a predetermined law making it possible to optimize the structural stress behaviour.

Finally, the different means used in the machines described with reference to FIGS. 3 to 5, 6, 7 and 8 can be replaced by technically equivalent means without passing outside the scope of the invention.

We claim:

1. Process for the production of a tight complex incorporating an internal reinforcement, and two covering films for the reinforcement, comprising stages of producing a nonwoven grid reinforcement formed from warp threads and weft threads arranged on two juxtaposed layers, preheating the covering films to a thermoassembly temperature wherein the preheating is performed by heating drums on which the films travel prior to their application to the nonwoven reinforcement and application of the preheating covering film to the nonwoven reinforcement, with a predetermined force and a complexing temperature by a pair of heating rollers set below the thermoassembly temperature and at most equal to the maximum temperature at which the warp and weft threads maintain their stress performance characteristics.

2. Process according to claim 1, wherein the nonwoven reinforcement is produced by successively carrying out a wefting operation by means of a continuous weft thread and a warping operation by means of a continuous warp thread, so as to form stress absorption loops on two lateral edges of the grid of the weft thread and on two terminal edges of the grid of the warp thread.

3. Process according to claim 2, wherein a cable for connecting the complex to an adjacent structure is passed into the stress absorption loops located on each of the lateral edges and on each of the terminal edges and consequently the covering films are not applied to the connecting cables.

4. Process according to claim 1, wherein the nonwoven reinforcement is produced by carrying out a wefting operation by means of a continuous weft thread, followed by a warping operation by means of separate warp threads, the warping operation and the application of the covering films being performed simultaneously and continuously and the wefting operation forming the stress absorption loops on two lateral edges of the grid is performed with the weft thread.

5. Process according to claim 4, wherein a connecting cable is passed into the stress absorption loops and the covering films are not applied to the connecting cable.

6. Process according to claim 1, wherein there is a simultaneous and continuous production of the nonwoven reinforcement, the preheating and application of the covering films, the nonwoven reinforcement being obtained by continuously carrying out a warping operation, a wefting operation and a welding operation of the warp and weft threads.

7. Process according to claim 1, wherein the complex is cooled after applying the covering films.

8. Process for the production of a tight complex incorporating an internal reinforcement, and two covering films for the reinforcement, comprising stages of producing a nonwoven grid reinforcement formed from warp threads and weft threads arranged on two juxtaposed layers, preheating the covering films to a thermoassembly temperature wherein the preheating is performed by heating drums on which the films travel prior to their application to the nonwoven reinforcement and application of the preheating covering film to the nonwoven reinforcement, with a predetermined force and a complexing temperature by a pair of heating rollers set below the thermoassembly temperature and at most equal to the maximum temperature at which the warp and weft threads maintain their stress performance characteristics, the nonwoven reinforcement being produced by successively carrying out a wefting operation by means of a continuous weft thread and a warping operation by means of a continuous warp thread, so as to form stress absorption loops on two lateral edges of the grid of the weft thread and on two terminal edges of the grid of the warp thread and the wefting operation is carried out by attaching the continuous weft thread to lateral attachment members distributed along lateral edges of the grid, which is followed by the warping operation by attaching the continuous warp thread to terminal attachment members distributed transversely over a width equal to a width of a wider transverse segment of the complex to be produced, a distance between this transverse segment and each of the terminal attachment members being modified so as to be equal to a final length of the corresponding strand of the warp thread in the complex to be produced, the warp thread strands are then locked on said wider transverse segment and to a first end of the grid is given its final width, by maintaining the strands under tension between a first end and said transverse segment, after which the strands of the warp thread on the transverse segment are slackened and finally the covering films are applied, whilst modifying the spacing of the warp thread strands, as from the first end and maintaining said strands under tension.

9. Process for the production of a tight complex incorporating an internal reinforcement, and two covering films for the reinforcement, comprising stages of producing a nonwoven grid reinforcement formed from warp threads and weft threads arranged on two juxtaposed layers, by successively carrying out a wefting operation by means of a continuous weft thread and a warping operation by means of a continuous warp thread, so as to form stress absorption loops on two lateral edges of the grid of the weft thread and on two terminal edges of the grid of the warp thread, said wefting operation being carried out by attaching the continuous weft thread to lateral attachment members distributed along lateral edges of the grid, which is followed by the warping operation by attaching the continuous warp thread to terminal attachment members distributed transversely over a width equal to a width of a wider transverse segment of the complex to be produced, a distance between this transverse segment and each of the terminal attachment members being modified so as to be equal to a final length of the corresponding strand of the warp thread in the complex to be produced, the warp thread strands are then locked on said wider transverse segment and to a first end of the grid is given its final width, by maintaining the strands under tension between a first end and said transverse segment, after which the strands of the warp thread on the transverse segment are slackened and finally the covering films are applied, whilst modifying the spacing of the warp thread strands, as from the first end and maintaining said strands under tension, preheating the covering films to a thermoassembly temperature and application of preheated covering films to the nonwoven reinforcement, with a predetermined force and a complexing temperature below the thermoassembly temperature and at most equal equal to a maximum temperature which can be withstood by the warp and weft threads.

10. Process according to claim 9, wherein a cable for connecting the complex to an adjacent structure is passed into the stress absorption loops located on each of the lateral edges and on each of the terminal edges and consequently the covering films are not applied to the connecting cables.

11. Process according to claim 9, wherein the nonwoven reinforcement is produced by carrying out a wefting operation by means of a continuous weft thread, followed by a warping operation by means of separate warp threads, the warping operation and the application of the covering films being performed simultaneously and continuously and the wefting operation forming the stress absorption loops on two lateral edges of the grid is performed with the weft thread.

12. Process according to claim 22, wherein a connecting cable is passed into the stress absorption loops and the covering films are not applied to the connecting cable.

13. Process according to claim 9, wherein there is a simultaneous and continuous production of the nonwoven reinforcement, the preheating and application of the covering films, the nonwoven reinforcement being obtained by continuously carrying out a warping operation, a wefting operation and a welding operation of the warp and weft threads.

14. Process according to claim 9, wherein the complex is cooled after applying the covering films.

* * * * *

UNITED STATES PATENT AND TRADEMARK OFFICE
CERTIFICATE OF CORRECTION

PATENT NO. : 5,380,388
DATED : January 10, 1995
INVENTOR(S) : Montagne et al

It is certified that error appears in the above-indentified patent and that said Letters Patent is hereby corrected as shown below:

Claim 12, Col. 16, Line 38, "22" should be --11--

Signed and Sealed this

Eleventh Day of April, 1995

*Attest:*

BRUCE LEHMAN

*Attesting Officer*          *Commissioner of Patents and Trademarks*